US006693405B2

(12) United States Patent
Blanke et al.

(10) Patent No.: US 6,693,405 B2
(45) Date of Patent: Feb. 17, 2004

(54) ELECTRICAL STEERING SYSTEM

(75) Inventors: Mogens Blanke, Farum (DK); Jesper Sandberg Thomsen, Aalborg (DK); John Kristensen, Sønderborg (DK); Torben Frederiksen, Augustenborg (DK)

(73) Assignee: Sauer-Danfoss Holding A/S, Nordborg (DK)

( * ) Notice: Subject to any disclaimer, the term of this patent is extended or adjusted under 35 U.S.C. 154(b) by 32 days.

(21) Appl. No.: 09/984,400

(22) Filed: Oct. 30, 2001

(65) Prior Publication Data
US 2002/0057070 A1 May 16, 2002

(30) Foreign Application Priority Data
Oct. 30, 2000 (DE) ............................ 100 53 818

(51) Int. Cl.[7] .............. H02P 5/34; H02P 7/42; B60K 1/00; B62D 5/04; B62D 11/00
(52) U.S. Cl. ............. 318/801; 318/806; 318/822; 318/586; 180/446; 180/65.1; 701/43
(58) Field of Search .................. 318/798–802, 318/806, 822, 826, 252, 264–267, 296–299, 543–548, 112, 586; 180/443, 446, 65.1, 65.8, 279, 277; 701/41, 43

(56) References Cited
U.S. PATENT DOCUMENTS

| 4,502,855 | A |   | 3/1985  | Petersen et al. |
| 4,506,339 | A |   | 3/1985  | Kühnlein |
| 4,621,327 | A | * | 11/1986 | Dolph et al. .................. 701/43 |
| 4,869,334 | A | * | 9/1989  | Marumoto et al. ......... 180/446 |
| 5,360,077 | A | * | 11/1994 | Nishimoto et al. ......... 180/446 |
| 5,747,950 | A | * | 5/1998  | Friedrichsen et al. ......... 318/5 |
| 5,828,972 | A |   | 10/1998 | Asanuma et al. |
| 6,208,923 | B1 |  | 3/2001  | Hommel |
| 6,394,218 | B1 |  | 5/2002  | Heitzer |
| 6,548,969 | B2 | * | 4/2003 | Ewbank et al. ............... 318/34 |
| 2002/0177932 | A1 | * | 11/2002 | Kifuku et al. ................ 701/41 |

FOREIGN PATENT DOCUMENTS

| DE | 196 25 350 A1 |   | 1/1998 |   |
| DE | 198 33 460 A1 |   | 1/2000 |   |
| DE | 19834870 A1 | * | 2/2000 | ............ B62D/6/00 |
| JP | 2000-43749 A |   | 2/2000 |   |

* cited by examiner

Primary Examiner—Robert E. Nappi
Assistant Examiner—Edgardo San Martin
(74) Attorney, Agent, or Firm—Burns, Doane, Swecker & Mathis, LLP

(57) ABSTRACT

An electrical steering system for a vehicle includes an electrically supplied steering motor arrangement which is connected with an inverter arrangement, whose output voltage is influenced by a computer arrangement, and a sensor arrangement. To reduce the cost of the steering system while also allowing the steering system to be steerable during braking in the case of a fault, the steering motor arrangement has a redundant steering motor which is connected with the computer arrangement via two separately run control circuits. The control circuits have separate electric supplies and the computer arrangement is redundant.

19 Claims, 3 Drawing Sheets

ELECTRICAL STEERING SYSTEM

This application is based on and claims priority under 35 U.S.C. §119 with respect to German Application No. 100 53 818.5 filed on Oct. 30, 2000, the entire content of which is incorporated herein by reference.

FIELD OF THE INVENTION

The invention generally relates to an electrical steering system. More particularly, the present invention pertains to an electrical steering system for a vehicle with an electrically supplied steering motor arrangement, which is connected with an inverter arrangement, whose output voltage is influenced by a computer arrangement, and with a sensor arrangement.

BACKGROUND OF THE INVENTION

A known electrical steering system is disclosed in DE 196 25 350 A1. Such steering system is preferably used with fork lifts and other self-propelled working machines, particularly with those operating in closed rooms, like for example warehouses. In this case, there is no longer a mechanical connection between the steering handwheel or a comparable control device and the steered wheel(s). Thus, in a manner of speaking, the driver or the operator has, in case of a failure of the steering system, no possibility of intervening in the steering behavior of the vehicle. It is therefore usually a requirement that each fault is immediately recognized and that the vehicle is immediately stopped, when a fault occurs. However, also in this connection dangerous situations may occur, as a vehicle with a large weight will always require a certain braking distance. The higher the weight of the vehicle, the longer the braking distance.

SUMMARY OF THE INVENTION

The invention is based on the task of equipping a steering system in such a way that it remains fully steerable during braking, at the lowest cost and effort possible.

With a steering system as mentioned in the introduction, this task is solved in that the steering motor arrangement has a redundant steering motor, which is connected with the computer arrangement via two separately run control circuits, which have separate electric supplies, the computer arrangement also being redundant.

With this embodiment a redundant steering system can be achieved at a reasonable cost and effort. It would be relatively easy to design a fault-tolerant system by doubling all elements. However, this solution is relatively expensive. The invention now foresees that not all elements are doubled, but that elements, which contribute considerably to the costs, are made redundant per se. Thus, for the major part of the steering system a two-circuit design is available, which also functions, when a fault occurs in one of the two circuits. The remaining elements, which are used in common in both circuits, are so fault tolerant, however, that they continue to work also when a fault has occurred. The result is a steering system, which is optimized with regard to costs, and which is nonetheless able to ensure full steering properties until the vehicle stops.

It is preferred that all control circuits have a common desired value specification device. For example, a steering handwheel can act as desired value specification device. It is assumed that a broken steering handwheel column is a very unlikely fault. Therefore, a protection against this fault has not been made. However, the operation is drastically simplified, when compared with systems in which it must be ensured that the driver activates both control circuits with independent operating elements.

Preferably, each control circuit has an independent current supply device having its own monitoring system. Such a current supply device can, for example, be a battery arrangement. The fact that each current supply device supplies own components, namely those of its own control circuit, ensures that the functioning of the steering system is also ensured when one current supply device fails. Each current supply device has its own monitoring, for example a voltage measuring, which reports back to the computer arrangement. When one current supply arrangement fails, the computer arrangement can then initiate the stopping procedure.

Preferably, each control circuit has an inverter, which is connected with the steering motor. Each inverter works with, for example, voltage modulations, typically with a pulse width modulation, and receives the corresponding modulation signals from the computer arrangement. Each inverter is supplied with voltage from its own current supply device, namely that of the belonging control circuit. The failure of an inverter is therefore uncritical for the steering ability of the vehicle on a whole.

Preferably, the steering motor has one winding arrangement for each control circuit. It can, for example, be made so that one stator is provided, which has a set of windings for each control circuit, which sets of windings act upon a common rotor. However, each set of windings can also have its own stator, each stator cooperating with a rotor, both rotors then being mounted on a common shaft. This gives the advantage that during faultless operation no negative mutual interferences can appear, as only one steering motor arrangement acts mechanically on the steered wheel(s). In case of a fault, however, one half of the steering motor can, in a manner of speaking, still provide the force required to steer the vehicle until it stands completely still.

It is particularly preferred that during failure of at least one inverter, each inverter is overloaded with the supply of the motor. This means that the inverters can be dimensioned in such a way that only together they are able to provide the electrical output required to control the steering motor arrangement. In case of a fault, one inverter is then overloaded. As, however, this overload only lasts until the vehicle stops, this overload can be accepted.

Preferably, each control circuit has a steering handwheel sensor. Thus, the fault redundancy increase can start already at a relatively early stage and it is ensured that all movements of the steering handwheel or a similar device can be registered several times.

It is preferred that the sensors are arranged in a common sensor unit. This gives the advantage that the coordination of the output signals of the sensors with each other is more easily realized. A sensor arrangement of this kind is disclosed in, for example, DE 31 45 162 A1.

Preferably, each control circuit has a midpoint sensor for the steering motor arrangement. In faultlessly working multi-phase systems, all phases work symmetrically. The midpoint of a star connection, which can also be called "star point", is always located on a specified potential, for example, the zero potential. Electrical faults in the windings, a short-circuit phase—phase or phase-ground or other faults will cause an asymmetry, which can be recorded by means of a measuring in the midpoint or the star point of the motor. Also a fault in an inverter will cause an asymmetry in the motor, and thus be recordable in the midpoint.

Preferably, the computer arrangement has at least two computers, of which one is made as a master computer and the other as a slave computer. This has the advantage that the slave computer can be made in a less expensive way. In a manner of speaking, the master computer assumes the "leading role". In this connection, "computer" means the totality of an arrangement, which is able to process incoming signals and convert them to output signals for the steering and, if required, for the driving of the vehicle, that is, having particularly a processor with input and output interfaces and a memory device for a program to be performed. Of course, it is not necessary for such a computer to have a keyboard and a screen or replaceable data carriers.

Preferably, the slave computer is made as a computer with reduced control capacity, which only serves the purpose of maintaining the steering ability. This means that during normal operation, the master computer can control the steering function, whereas, due to its reduced capacity, the production of the slave computer can be substantially cheaper.

Preferably, the two computers monitor each other. This improves the reliability of recording faults occurring in the computers.

It is also preferred that on occurrence of a fault, the faultless computer turns off the failing computer. Thus, a faulty computer is prevented from having further influence on the system.

Preferably, during faultless operation one computer controls all inverters, and in case of a fault, the failing computer hands over its control to another computer. This has the advantage that synchronization problems in connection with the control of the inverters will not occur. As all inverters are controlled in the same way, also the steering motor arrangement can be operated without interferences. Also in case of faults this situation does not change, as the control of the inverters is handed over completely from one computer to the other.

Preferably, the computer arrangement sends a modulation signal and an activation signal to each inverter, the activation signal for each inverter being individually variable. This simplifies the disconnection of an inverter when a fault occurs in this inverter or in the motor connected with it. An interference with the modulation signals is thus not possible, on the contrary, it is sufficient to change the activation signal for the inverter in question, for example to turn off this inverter.

BRIEF DESCRIPTION OF THE DRAWING FIGURES

In the following, the invention is described in detail on the basis of a preferred embodiment in connection with the accompanying drawing figures.

DETAILED DESCRIPTION OF THE INVENTION

Figure 1:
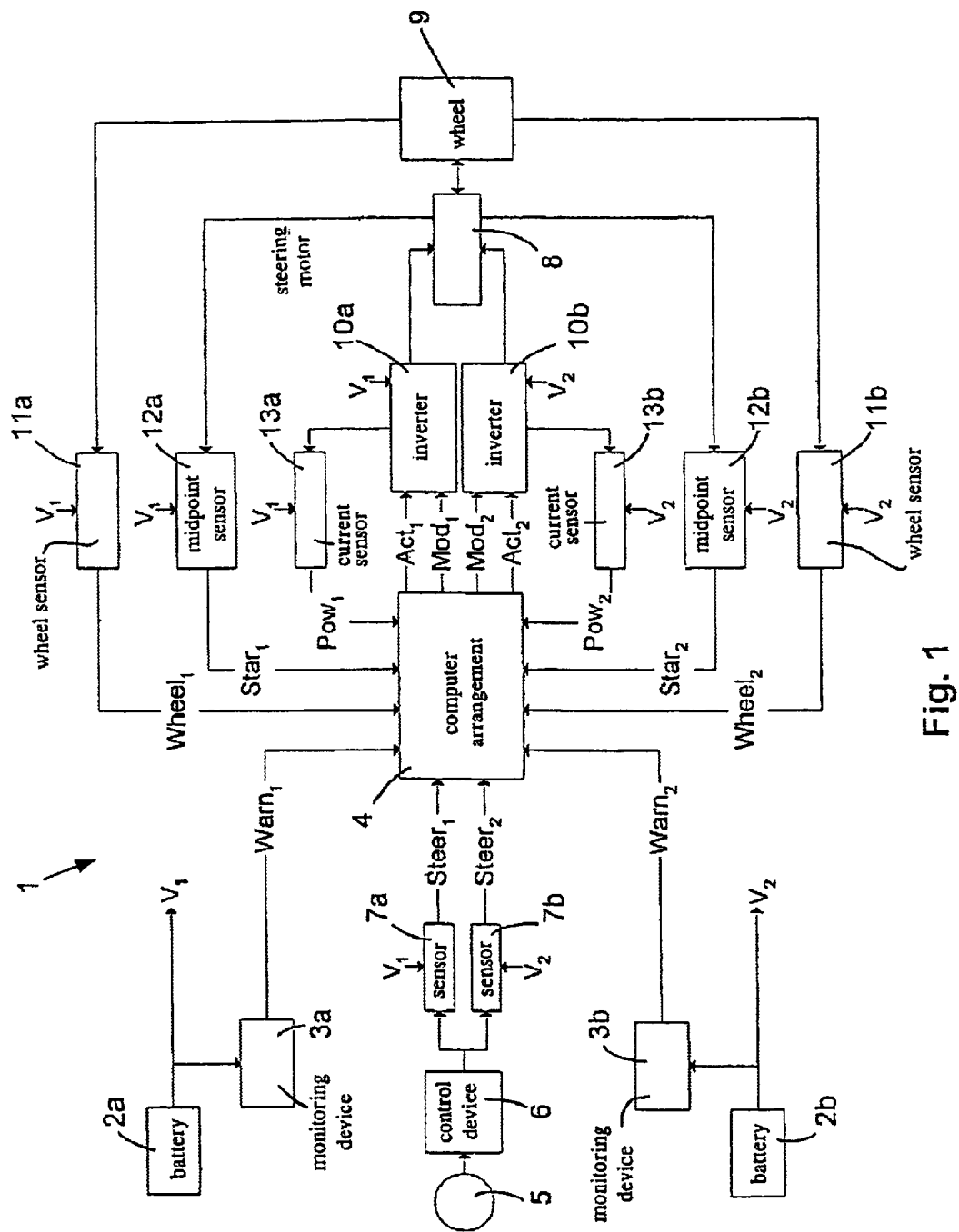
FIG. 1 is a schematic view of a steering system.

FIG. 1 shows a steering system 1, which is called a fault tolerant system. This system is not completely redundant in view of a problem-free continuation of steering and driving in connection with any individual fault. The following description particularly concentrates upon how the functionality can be ensured in the case of faults, that is, how the steering ability can be ensured right until standstill in the case of a fault. The way of recording the fault in the individual cases is of minor importance.

The fault tolerant steering system shown in FIG. 1 has two voltage supplies in the form of two batteries 2a, 2b. As can be seen from the following explanation, most of the elements are available twice, and therefore the reference numbers for these elements are extended by "a" for a first control circuit and "b" for a second control circuit.

The battery 2a supplies a voltage $V_1$ and the battery 2b a voltage $V_2$. When in the following, the reference signs $V_1$, $V_2$ are shown with an arrow pointing to an element, this means that the corresponding element is supplied with the voltage from the battery 2a or 2b, respectively.

Each battery has a monitoring device 3a, 3b, preferably a voltage measuring device, which reports back to a computer arrangement in the case of a fault. The monitoring 3a, 3b is made in such a way that a fault in the battery 2a, 2b causes a signal change to the computer arrangement 4 on a level, which has the level of the failure of the battery supply. When, for example, the voltage of the battery 2a, 2b drops, the monitoring device 3a, 3b generates a signal $Warn_1$ or $Warn_2$, respectively, with a level of logical zero. This "signal level" can also be generated in the case of a failure of the battery voltage. When such a fault occurs, the computer arrangement 4 can stop the vehicle, the steering ability being ensured, as the other battery is still functioning. A fault in the corresponding monitoring device will cause a corresponding signal change to the computer arrangement 4. In this way, the complete steering system is also tolerant towards a fault in one of the two monitoring devices.

The steering system 1 is operated by a user 5, which activates a steering handwheel 6 or another control device, for example a joystick. The steering handwheel 6 is connected with two independent sensors 7a, 7b, each being supplied by the battery 2a, 2b, which is indicated by means of the arrows $V_1$, $V_2$. The outputs $Steer_1$, $Steer_2$ of the two sensors 7a, 7b are connected with the computer arrangement 4. As each of the two sensors 7a, 7b has its own current supply, the operability is ensured, independently of the nature of the individual fault. A broken steering handwheel column, however, is considered to be unlikely. A protection against this fault has not been made. The two sensors 7a, 7b can be joined in one fault-safe sensor unit, as shown in, for example, DE 31 45 162 A1. It is essential that the recording of the angle position of the steering handwheel can also take place in the case of a fault in a sensor 7a, 7b or in a battery 2a, 2b.

The steering system 1 has a steering motor 8 (to the right), which is connected with a steered wheel 9 or with steered wheels via a gear, which is not shown in detail. The steering motor 8 drives the wheel 9 in dependence of the angle position of the steering handwheel 6. The steering motor 8 is made to be redundant. This embodiment can have several forms. One possibility is that several independent windings are arranged in a stator, which windings then act upon a common rotor. However, a stator can also be provided for each set of windings, the stator cooperating with its own rotor, all rotors being arranged on a common shaft.

Each winding or each set of windings, respectively, is connected with an inverter 10a, 10b, each receiving its voltage $V_1$, $V_2$ from the belonging battery 2a, 2b. The inverters 10a, 10b are controlled by the computer arrangement 4. The computer arrangement 4 sends a modulation signal $Mod_1$, $Mod_2$ to each inverter 10a, 10b, these signals being identical, and additionally, the computer arrangement 4 sends a signal $Act_1$, $Act_2$ to each inverter 10a, 10b. This signal is an activation signal, due to which the inverter 10a, 10b is either activated or stopped.

The two inverters 10a, 10b are dimensioned so that together they can provide the electrical output required to drive the steering motor 8. When a control circuit fails, and thus also one of the inverters 10a, 10b, the other inverter 10b, 10a is overloaded, when it has to ensure a sufficient torque via the steering motor 8 to the steered wheel 9. The only thing that matters, however, is to ensure the steering ability until the vehicle has stopped, and therefore this overload is acceptable. Usually, the stopping maneuver will only last for a limited time.

The angle position of the wheel 9 is recorded via two wheel sensors 11a, 11b. The two wheel sensors 11a, 11b can also be joined to one fail-safe sensor unit, that is, in a housing. The corresponding angle position information is supplied to the computer arrangement 4 via a signal $Wheel_1$, $Wheel_2$.

Electrical faults in the windings of the steering motor 8, for example a short-circuiting phase—phase or phase-ground, lead to an asymmetry in the rotating field of the motor 8. An asymmetry of this kind can be recorded by a measuring in the midpoint or the star point of the steering motor 8 or the individual windings, respectively. Also a fault in an inverter 10a, 10b will cause a corresponding asymmetry and can therefore be recorded in the midpoint. For this reason, midpoint sensors 12a, 12b are provided, which also supply their output signal $Star_1$, $Star_2$ to the computer arrangement 4. With an inverter control of an electric motor, the third harmonic of the supply frequency will always appear in the midpoint, however, with a relatively limited amplitude. In the case of large load or speed changes, this amplitude will be heavily increased for a short period. To avoid that this is by mistake recorded as a fault, either a relatively high fault threshold for the midpoint measuring or a dead time is provided in the system, so that operationally caused midpoint voltage changes do not lead to a disconnection of the system. Alternatively, a frequency analysis can be made on the basis of the midpoint measuring, during which the basic frequency is detected. The basic frequency will namely only appear in a fault situation. However, a frequency analysis of this kind requires a substantial calculation effort, which is not economically available at the moment. Tests have shown that a pure voltage measuring in the midpoint is sufficient for the fault recording.

Finally, the inverter 10a, 10b can be supplied with current sensors 13a, 13b, which serve the purpose of measuring the output, and which also send an output signal $Pow_1$, $Pow_2$ to the computer arrangement 4. The three sensors 11a, 12a, 13a and 11b, 12b, 13b, respectively, are supplied with voltages $V_1$, $V_2$ by the corresponding battery 2a, 2b.

It can be seen that the steering system 1 has control circuits, which are separately supplied with current and separately run, having only the redundant steering motor 8 with steered wheel 9, the steering handwheel 6 and the computer arrangement 4 in common. Otherwise, each control circuit has the steering motor 8, the sensors 11a to 13a, 11b to 13b, the sensors 7b, 7a and the common computer arrangement 4. Also the steering handwheel 6 is common for both control circuits.

When one of the elements 10a to 13a or 10b to 13b, respectively, or 7a, 7b, which are available once in each control circuit and therefore twice in the steering system 1, fails, this is uncritical, as the other control circuit will continue to be operational. Due to the embodiment described above, the motor is redundant, meaning that also here a partial fault is uncritical. The computer arrangement has a special embodiment, which is described in detail in connection with FIGS. 2 to 4. Also here the desired fault tolerance is available.

Figure 2:
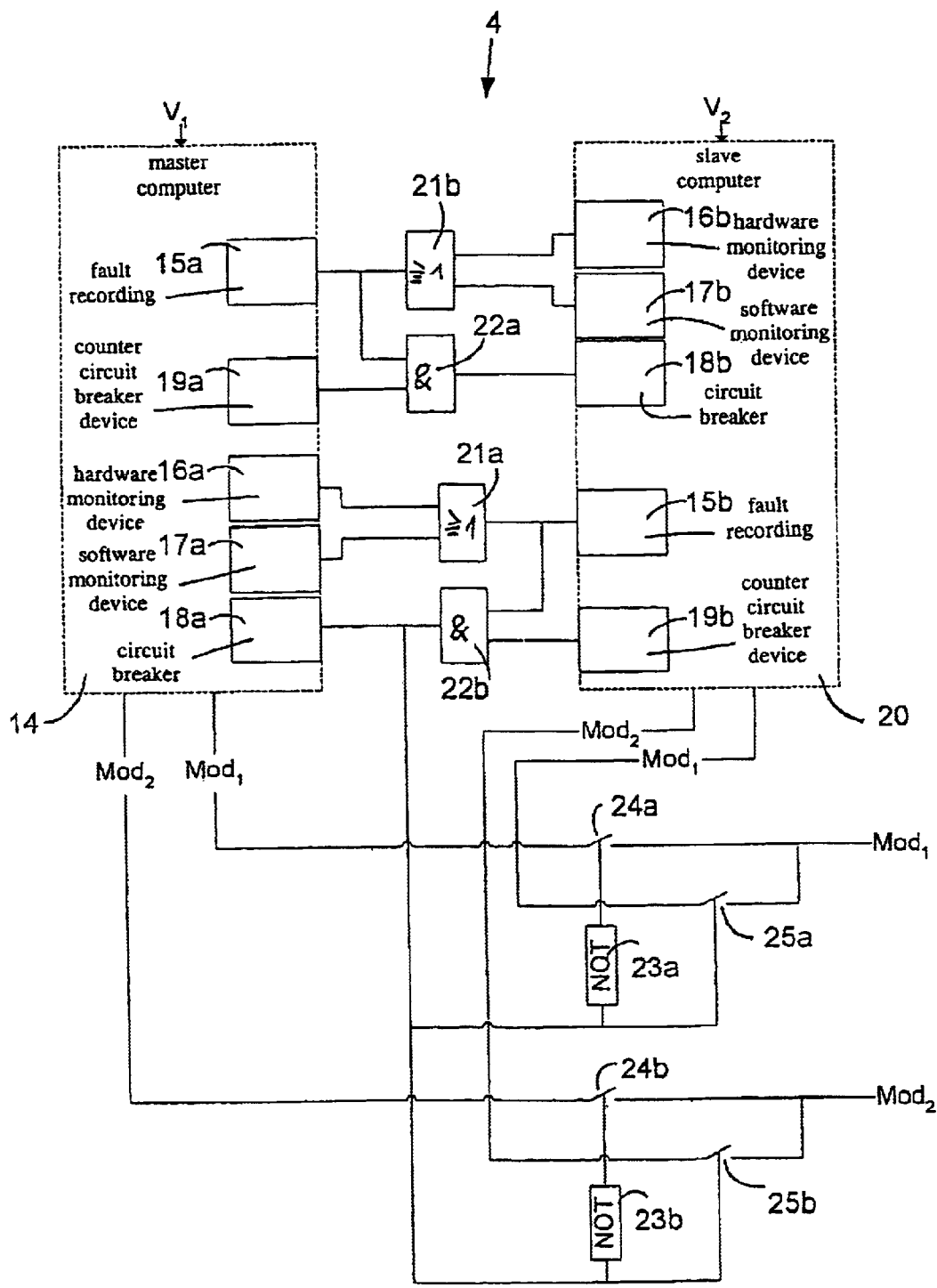
FIG. 2 is a schematic view of a computer arrangement.

FIG. 2 is a schematic view of the computer arrangement 4. The computer arrangement 4 has a master computer 14, of which some components are shown. In detail, they are a fault recording 15a, a hardware monitoring switch 16a, a so-called hardware watch dog or HW watch dog, a software watch dog or a software monitoring switch 17a and a circuit breaker 18a. Finally, the main computer 14 also has a counter circuit breaker device 19a for the other computer, the slave computer 20. The slave computer 20 has corresponding units, whose reference numbers are characterized with the letter "b". All units or elements 15a to 19a and 15b to 19b, respectively, can also be realized by way of software or programs, except for the hardware monitoring.

The hardware monitoring device 16a and the software monitoring device 17a are connected with the fault recording device 15b of the slave computer 20 via an OR-link 21a. Accordingly, the hardware monitoring device 16b and the software monitoring device 17b are connected with the fault recording device 15a of the master computer 14 via an OR-link 21b. The counter circuit breaker device 19a and the fault recording device 15a are connected with the circuit breaker 18b of the slave computer via an AND-link 22a. Accordingly, the fault recording device 15b and the counter circuit breaker device 19b are connected with the circuit breaker 18a of the master computer via an AND-link 22b.

Initially, the master computer 14 and the slave computer 20, each being supplied with independent voltages $V_1$, $V_2$ by the batteries 2a, 2b, monitor themselves by means of the hardware and software monitoring devices 16a, 16b, 17a, 17b. For additional security, however, it is ensured, that one computer monitors the other, and, in the case of a fault, turns off the failing computer. When, for example, the master computer 14 discovers, by means of the fault recording device 15a, that either a hardware fault or a software fault has occurred in the slave computer 20, the AND-link 22a gets the corresponding information simultaneously. The master computer then decides, if it generates a corresponding disconnection signal for the slave computer 20 via the counter circuit breaker device 19a. If this is the case, the output of the AND-link 22a sends a corresponding order to the switch 18b. In the case of a fault in the master computer 14, the situation is accordingly reversed.

The master computer 14 supplies a signal $Mod_1$ for the first inverter 10a and a signal $Mod_2$ for the second inverter 10b. In the same way, the slave computer 20 generates the two signals $Mod_1$, $Mod_2$.

In the case of no faults, only the modulation signals $Mod_1$, $Mod_2$ are transmitted from the master computer 14 to the two inverters 10a, 10b. For this purpose, the circuit breaker 18a is connected with switches 24a, 24b via NOT-links 23a, 23b, respectively, and without NOT-links also with switches 25a, 25b. Thus, it is ensured that when the master computer 14 works correctly, the modulation signals $Mod_1$, $Mod_2$ are passed on to the inverters 10a, 10b via the closed switches 24a, 24b, whereas, in the case of a fault, when the circuit breaker device 18a receives a corresponding input signal, the switches 24a, 24b are opened and the other switches 25a, 25b are closed, so that the inverters 10a, 10b are then controlled by the slave computer 20.

Figure 3:
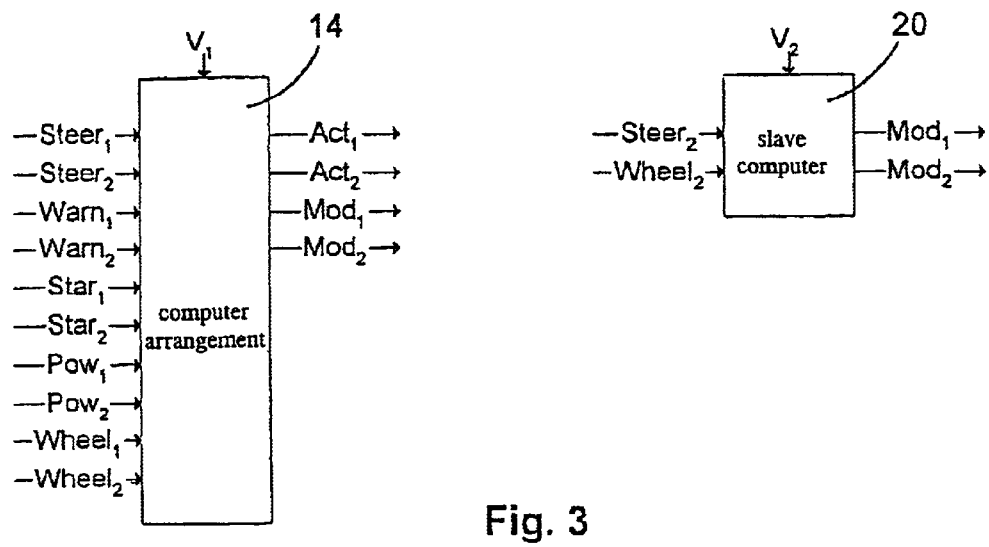
FIG. 3 is a comparison between two computers of the computer arrangement.

FIG. 3 shows that the two computers, namely the master computer 14 and the slave computer 20, are similar, but not identical. The slave computer 20 is reduced with regard to signal capacity, and is only able to handle the signals required to maintain the steering ability. Accordingly, the slave computer 20 only receives the signals $Steer_2$ of the second steering wheel sensor 7b and $Wheel_2$ of the second wheel sensor 11b. The computer generates the modulation signals $Mod_1$, $Mod_2$ for the two inverters 10a, 10b. The master computer 14 receives the output signals $Steer_1$, $Steer_2$, $Warn_1$, $Warn_2$, $Star_1$, $Star_2$, $Pow_1$, $Pow_2$, $Wheel_1$, $Wheel_2$ of all sensors 7a, 7b, 11a to 13a, 11b to 13b. The master computer 14 generates the modulation signals $Mod_1$, $Mod_2$ and additionally the activation signals $Act_1$, $Act_2$, with which the individual inverters 10a, 10b can be disconnected, if a fault is observed here.

Figure 4:
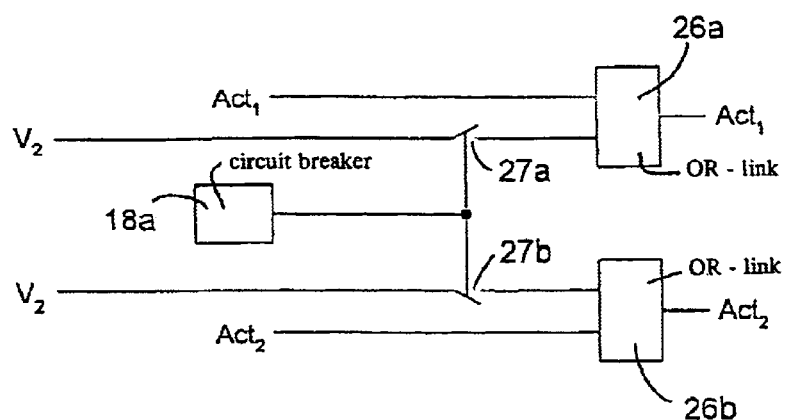
FIG. 4 is a detailed view of the signal processing in the case of a fault in a computer.

When now the master computer 14 is disconnected, usually the activation signal $Act_1$, $Act_2$ would be discontinued. FIG. 4 shows a solution to avoid this problem. The two signals $Act_1$, $Act_2$ are led to corresponding outputs $Act_1$, $Act_2$ via OR-links 26a, 26b. The other input of these OR-links 26a, 26b is connected via switch 27a, 27b with the supply voltage $V_2$ of the second battery 2b. When now a corresponding signal appears at the circuit breaker device 18a of the master computer 14, the two switches 27a, 27b are closed, so that a corresponding signal (logic 1) appears on the second output of the OR-links 26a, 26b, and a corresponding logic 1 on the outputs $Act_1$, $Act_2$ of the OR-links 26a, 26b.

Thus, the steering system 1 is fault-tolerant towards practically all imaginable faults. However, not all elements are fully doubled. On the contrary, they are optimized towards minimum requirements.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Electrical steering system for a vehicle comprising an electrically supplied redundant steering motor, a computer arrangement, and a sensor arrangement, the redundant steering motor being connected with the computer arrangement via two separately run control circuits which have separate electric supplies, the computer arrangement also being redundant, each control circuit being comprised of an inverter, with both inverters being connected to the redundant steering motor so that the inverters together provide an electrical output required to drive the redundant steering motor during faultless operation of the steering system.

2. The electrical steering system according to claim 1, wherein the control circuits having a common desired value specification device.

3. The electrical steering system according to claim 2, wherein each control circuit has an independent current supply device each provided with a respective monitoring system.

4. The electrical steering system according to claim 1, wherein the steering motor has one winding arrangement for each control circuit.

5. The electrical steering system according to claim 1, wherein each inverter is overloaded with the supply of the motor during failure of at least one inverter.

6. The electrical steering system according to claim 1, wherein each control circuit has a steering handwheel sensor.

7. The electrical steering system according to claim 6, wherein the steering handwheel sensors are arranged in a common sensor unit.

8. The electrical steering system according to claim 1, wherein each control circuit has a midpoint sensor for the steering motor arrangement.

9. The electrical steering system according to claim 1, wherein the computer arrangement has at least first and second computers, the first computer being a master computer and the second computer being a slave computer.

10. The electrical steering system according to claim 9, wherein the slave computer is made as a computer with reduced control capacity which only serves to maintain steering ability.

11. The electrical steering system according to claim 9, wherein the first and second computers monitor each other.

12. The electrical steering system according to claim 11, wherein upon one of the first and second computers experiencing a fault while the other of the first and second computers is faultless, the faultless computer turns off the computer experiencing the fault.

13. The electrical steering system according to claim 12, wherein during faultless operation, one of the first and second computers controls all of the inverters, and upon one of the first and second computers experiencing a fault, the computer experiencing the fault turns over control to another computer.

14. The electrical steering system according to claim 9, wherein the computer arrangement sends a modulation signal and an activation signal to each inverter, with the activation signal for each inverter being individually variable.

15. The electrical steering system according to claim 1, wherein each control circuit has an independent current supply device each provided with a respective monitoring system.

16. The electrical steering system according to claim 1, wherein the steering motor has one winding arrangement for each control circuit.

17. Electrical steering system for a vehicle comprising an electrically supplied steering motor arrangement, which is connected with an inverter arrangement, whose output voltage is influenced by a computer arrangement, and a sensor arrangement, the steering motor arrangement having a redundant steering motor which is connected with the computer arrangement via two separately run control circuits which have separate electric supplies, the computer arrangement also being redundant, wherein each control circuit has a steering handwheel sensor.

18. The electrical steering system according to claim 17, wherein the steering handwheel sensors are arranged in a common sensor unit.

19. Electrical steering system for a vehicle comprising an electrically supplied steering motor arrangement having a redundant steering motor which is connected with a computer arrangement via two separately run control circuits which have separate electric supplies, the computer arrangement also being redundant, each control circuit comprising an inverter connected to the steering motor arrangement and a current sensor which measures an output of the inverter of the respective control circuit, each current sensor being supplied with voltage by the electric supply of the respective control circuit and being connected to the computer arrangement to provide an output signal to the computer arrangement.

* * * * *